(12) United States Patent
Lee et al.

(10) Patent No.: US 10,631,291 B2
(45) Date of Patent: Apr. 21, 2020

(54) REFERENCE SIGNAL GENERATION METHOD IN WIRELESS COMMUNICATION SYSTEM SUPPORTING MASSIVE MIMO

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/515,096

(22) PCT Filed: Oct. 5, 2015

(86) PCT No.: PCT/KR2015/010512
§ 371 (c)(1),
(2) Date: Mar. 28, 2017

(87) PCT Pub. No.: WO2016/056805
PCT Pub. Date: Apr. 14, 2016

(65) Prior Publication Data
US 2017/0245271 A1    Aug. 24, 2017

Related U.S. Application Data

(60) Provisional application No. 62/062,114, filed on Oct. 9, 2014.

(51) Int. Cl.
*H04B 7/06* (2006.01)
*H04W 72/04* (2009.01)
(Continued)

(52) U.S. Cl.
CPC .......... *H04W 72/0446* (2013.01); *H04B 7/06* (2013.01); *H04L 5/001* (2013.01);
(Continued)

(58) Field of Classification Search
CPC .......... H04W 72/0446; H04W 72/0424; H04L 5/001; H04L 5/0016; H04L 5/0023;
(Continued)

(56) References Cited

U.S. PATENT DOCUMENTS

2010/0272040 A1* 10/2010 Nam ................... H04J 13/0077
370/329
2010/0279628 A1* 11/2010 Love ....................... H04L 5/003
455/70

(Continued)

FOREIGN PATENT DOCUMENTS

CN       102461052     5/2012
EP       2866358       4/2015
(Continued)

OTHER PUBLICATIONS

European Patent Office Application Serial No. 15849231.4, Search Report dated May 23, 2018, 13 pages.

(Continued)

*Primary Examiner* — Jeffrey M Rutkowski
*Assistant Examiner* — Jasper Kwoh
(74) *Attorney, Agent, or Firm* — Lee Hong Degerman Kang & Waimey

(57) ABSTRACT

Disclosed is a reference signal generation method in which generated are reference signal sequences applied, if the number of antenna ports used in data transmission is 9 or more, the reference signal sequences are mapped to resource regions allocated to the plurality of antenna ports, respectively, and a subframe to which the reference signal sequences are mapped is transmitted to a terminal. In the reference signal generation method, a resource region to which mapped is a reference signal sequence with respect to the ninth antenna port among the plurality of antenna ports is identical to a resource region to which mapped is a (Continued)

reference signal sequence with respect to the tenth antenna port, and the reference signal sequence with respect to the ninth antenna port and the reference signal sequence with respect to the tenth antenna port are multiplexed by means of CDM.

6 Claims, 19 Drawing Sheets

(51) Int. Cl.
*H04L 5/00* (2006.01)
*H04L 27/26* (2006.01)

(52) U.S. Cl.
CPC .......... *H04L 5/0016* (2013.01); *H04L 5/0023* (2013.01); *H04L 5/0048* (2013.01); *H04L 5/0051* (2013.01); *H04L 27/2601* (2013.01); *H04W 72/042* (2013.01); *H04L 5/0017* (2013.01)

(58) Field of Classification Search
CPC ... H04L 5/0048; H04L 5/0051; H04L 5/0017; H04L 27/2601; H04B 7/06
See application file for complete search history.

(56) References Cited

U.S. PATENT DOCUMENTS

| | | | | |
|---|---|---|---|---|
| 2011/0085503 | A1* | 4/2011 | Nam | H04B 7/0452 370/329 |
| 2011/0111781 | A1* | 5/2011 | Chen | H04B 7/02 455/507 |
| 2011/0176517 | A1* | 7/2011 | Hu | H04L 5/0026 370/335 |
| 2011/0249767 | A1* | 10/2011 | Chen | H04L 5/0023 375/295 |
| 2011/0310825 | A1* | 12/2011 | Hu | H04L 5/0017 370/329 |
| 2012/0027120 | A1* | 2/2012 | Noh | H04L 1/0026 375/295 |
| 2012/0300728 | A1 | 11/2012 | Lee et al. | |
| 2013/0010707 | A1* | 1/2013 | Gaal | H04L 5/003 370/329 |
| 2013/0010836 | A1* | 1/2013 | Sartori | H04L 5/0016 375/146 |
| 2013/0044727 | A1 | 2/2013 | Nory et al. | |
| 2013/0064216 | A1 | 3/2013 | Gao et al. | |
| 2013/0265962 | A1* | 10/2013 | Ouchi | H04W 72/02 370/329 |
| 2013/0272151 | A1 | 10/2013 | Thomas et al. | |
| 2014/0293944 | A1* | 10/2014 | Kim | H04W 72/042 370/329 |
| 2014/0341145 | A1* | 11/2014 | Nakashima | H04W 72/042 370/329 |
| 2015/0288497 | A1* | 10/2015 | Li | H04B 7/0413 370/329 |
| 2016/0242060 | A1* | 8/2016 | Kakishima | H04W 16/28 |

FOREIGN PATENT DOCUMENTS

| | | |
|---|---|---|
| KR | 20140057005 | 5/2014 |
| WO | 2014003384 | 1/2014 |
| WO | 2014038865 | 3/2014 |
| WO | 2014069821 | 5/2014 |

OTHER PUBLICATIONS

PCT International Application No. PCT/KR2015/010512, Written Opinion of the International Searching Authority dated Jan. 22, 2016, 20 pages.

* cited by examiner

FIG. 9
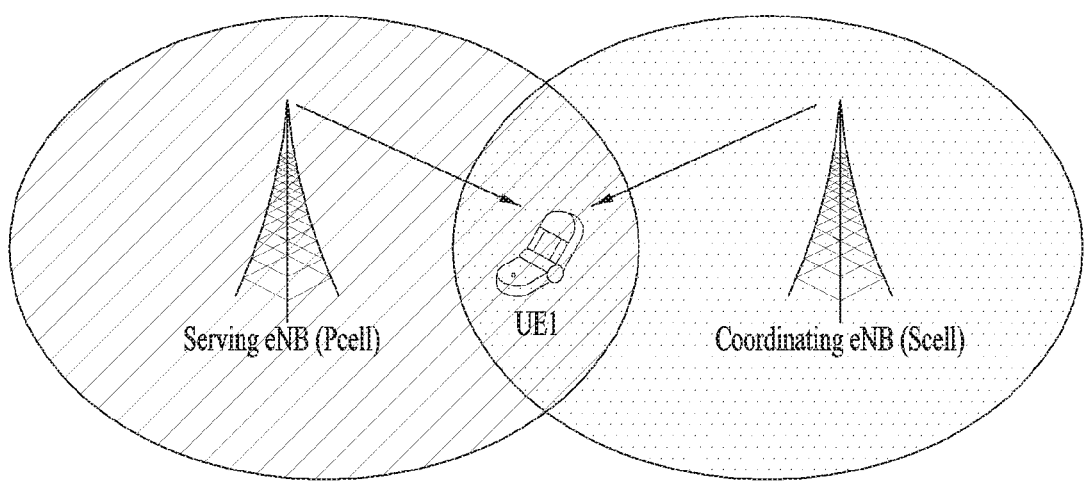
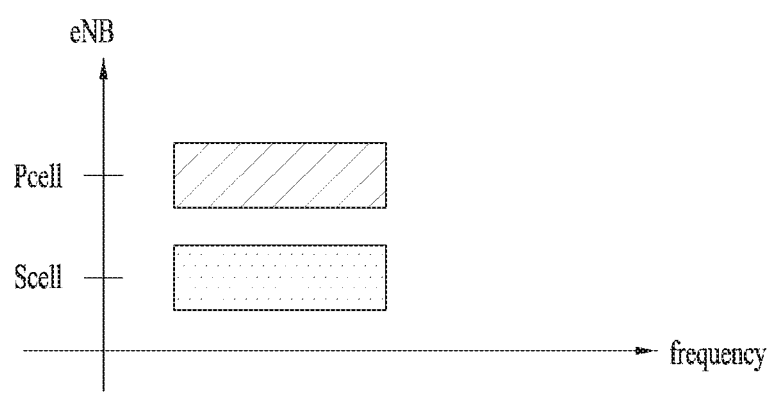

(a)　　　　　　　　　　　(b)

REFERENCE SIGNAL GENERATION METHOD IN WIRELESS COMMUNICATION SYSTEM SUPPORTING MASSIVE MIMO

CROSS-REFERENCE TO RELATED APPLICATIONS

This application is the National Stage filing under 35 U.S.C. 371 of International Application No. PCT/KR2015/010512 filed on Oct. 5, 2015, which claims the benefit of U.S. Provisional Application No. 62/062,114, filed on Oct. 9, 2014, the contents of which are all hereby incorporated by reference herein in their entirety.

TECHNICAL FIELD

Following description relates to a wireless communication system, and more particularly, to a method of generating a reference signal in a wireless communication system supporting massive MIMO including a plurality of antennas and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them.

For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

The present invention is designed to solve the aforementioned general and technical problem. One object of the present invention is to design a reference signal for performing multi-stream transmission in environment supporting massive MIMO.

Another object of the present invention is to design a reference signal capable of maintaining backward compatibility and capable of being utilized for a new communication system.

The other object of the present invention is to configure a reference signal that minimizes an influence on signals transmitted in a subframe.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of generating a reference signal (RS) at a base station including a plurality of antennas in a wireless communication system, comprises the steps of generating a reference signal reference which is applied when a number of antenna ports used for data transmission is equal to or greater than 9, mapping the reference signal sequence to a resource region respectively allocated to a plurality of antenna ports, and transmitting a subframe to which the reference signal sequence is mapped to a user equipment. In this case, a resource region to which a reference signal sequence for a ninth antenna port is mapped is identical to a resource region to which a reference signal sequence for a tenth antenna port is mapped and the reference signal sequence for the ninth antenna port and the reference signal sequence for the tenth antenna port are multiplexed using a CDM (code division multiplexing) scheme.

The resource region to which the reference signal sequence is mapped can be defined on a third OFDM (orthogonal frequency division multiplexing) symbol and a fourth OFDM symbol of a second slot of the subframe.

A reference signal sequence for each of a plurality of the antenna ports can be mapped to the total 6 REs (resource elements), each of which is arranged with a space of 4 subcarriers, in response to the adjacent two OFDM symbols.

A plurality of the antenna ports consist of 8 antenna ports ranging from an antenna port index 23 to an antenna port index 30, an index of the ninth antenna port corresponds to 23, and an index of the tenth antenna port may correspond to 24.

Reference signal sequences for two antenna ports of antenna port indexes 25 and 26 are mapped to the same resource region and are multiplexed using the CDM scheme, reference signal sequences for two antenna ports of antenna port indexes 27 and 28 are mapped to the same resource region and are multiplexed using the CDM scheme, and reference signal sequences for two antenna ports of antenna port indexes 29 and 30 are mapped to the same resource region and can be multiplexed using the CDM scheme.

When there exists an antenna port not in use among the 8 antenna ports, PDSCH (physical downlink shared channel) can be mapped and transmitted to a resource region to which a reference signal sequence for the antenna port not in use is mapped.

If a resource region to which reference signal sequences for the 8 antenna ports are mapped is overlapped with a resource region to which a CSI-RS (channel state information-reference signal) is mapped, the CSI-RS can be dropped.

To further achieve these and other advantages and in accordance with the purpose of the present invention, according to a different embodiment, a base station including a plurality of antennas and generating a reference signal in a wireless communication system includes a transmitting unit, a receiving unit, and a processor configured to generate a reference signal in a manner of being connected with the transmitting unit and the receiving unit, the processor configured to generate a reference signal reference which is applied when a number of antenna ports used for data transmission is equal to or greater than 9, the processor configured to map the reference signal sequence to a resource region respectively allocated to a plurality of antenna ports, the processor configured to control the transmitting unit to transmit a subframe to which the reference signal sequence is mapped to a user equipment. In this case, a resource region to which a reference signal sequence for a ninth antenna port is mapped is identical to a resource region to which a reference signal sequence for a tenth antenna port is mapped and the reference signal sequence for the ninth antenna port and the reference signal sequence for the tenth antenna port are multiplexed using a CDM (code division multiplexing) scheme.

Advantageous Effects

As is apparent from the above description, the embodiments of the present invention have the following effects.

First of all, it is able to efficiently perform communication using a reference signal designed in massive MIMO environment Secondly, since it is able to maintain backward compatibility with a newly designed reference signal, it is also able to guarantee communication with legacy terminals.

Thirdly, since an additionally designed reference signal is able to minimize an influence on transmission of a CRS, a CSI-RS, and the like, overhead of reference signal configuration can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. The technical characteristic of the present invention is not restricted by a specific drawing. The characteristics disclosed in each of the drawings can be combined with each other to configure a new embodiment. Reference numerals in each drawing correspond to structural elements.

FIG. 9 is a conceptual view illustrating a CoMP system operated based on a CA environment.

BEST MODE

Mode for Invention

Figure 1:
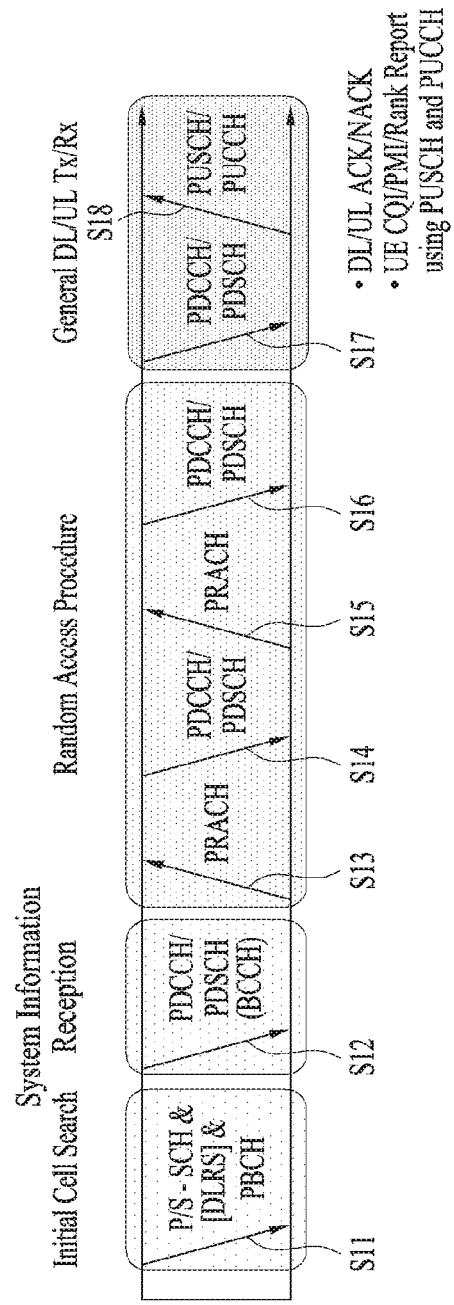
FIG. 1 is a conceptual diagram illustrating physical channels used in the embodiments and a signal transmission method using the physical channels.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS)', 'terminal', 'station (STA), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

When a device performs communication with a 'cell', it may indicate that the device transceiver a signal with a base station of the cell. In particular, a target with which a signal is actually transmitted and received may correspond to a specific base station. Yet, for clarity, it may be able to represent as a signal is transmitted and received with a cell formed by the specific base station. Similarly, such an expression as 'macro cell' and/or 'small cell' may indicate specific coverage, respectively. However, they may indicate a 'macro base station supporting macro cell' and a 'small cell base station supporting small cell', respectively.

The embodiments of the present invention are supported by standard documents disclosed in at least one of the IEEE 802.xx system, the 3GPP system, the 3GPP LTE system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
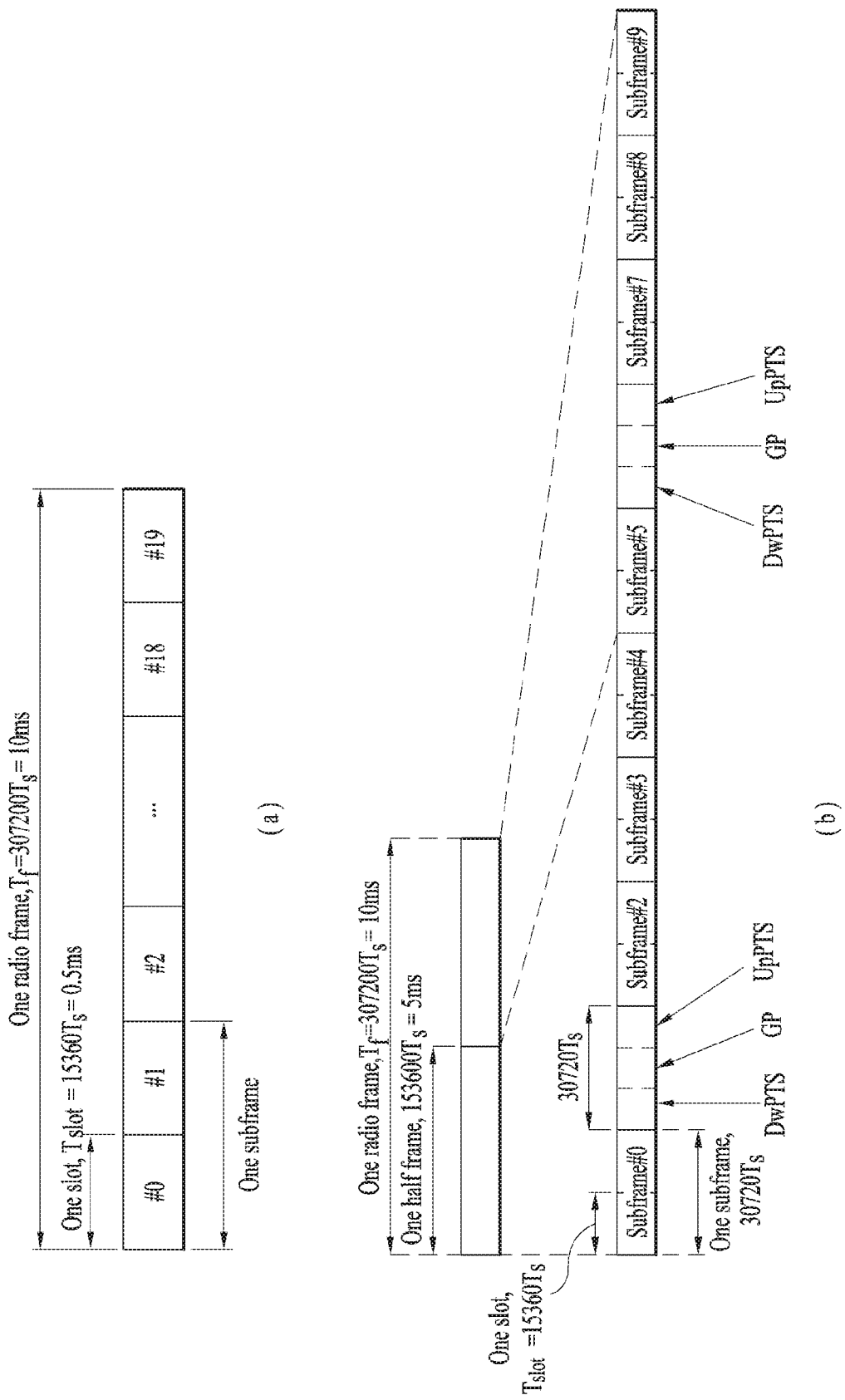
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz·2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
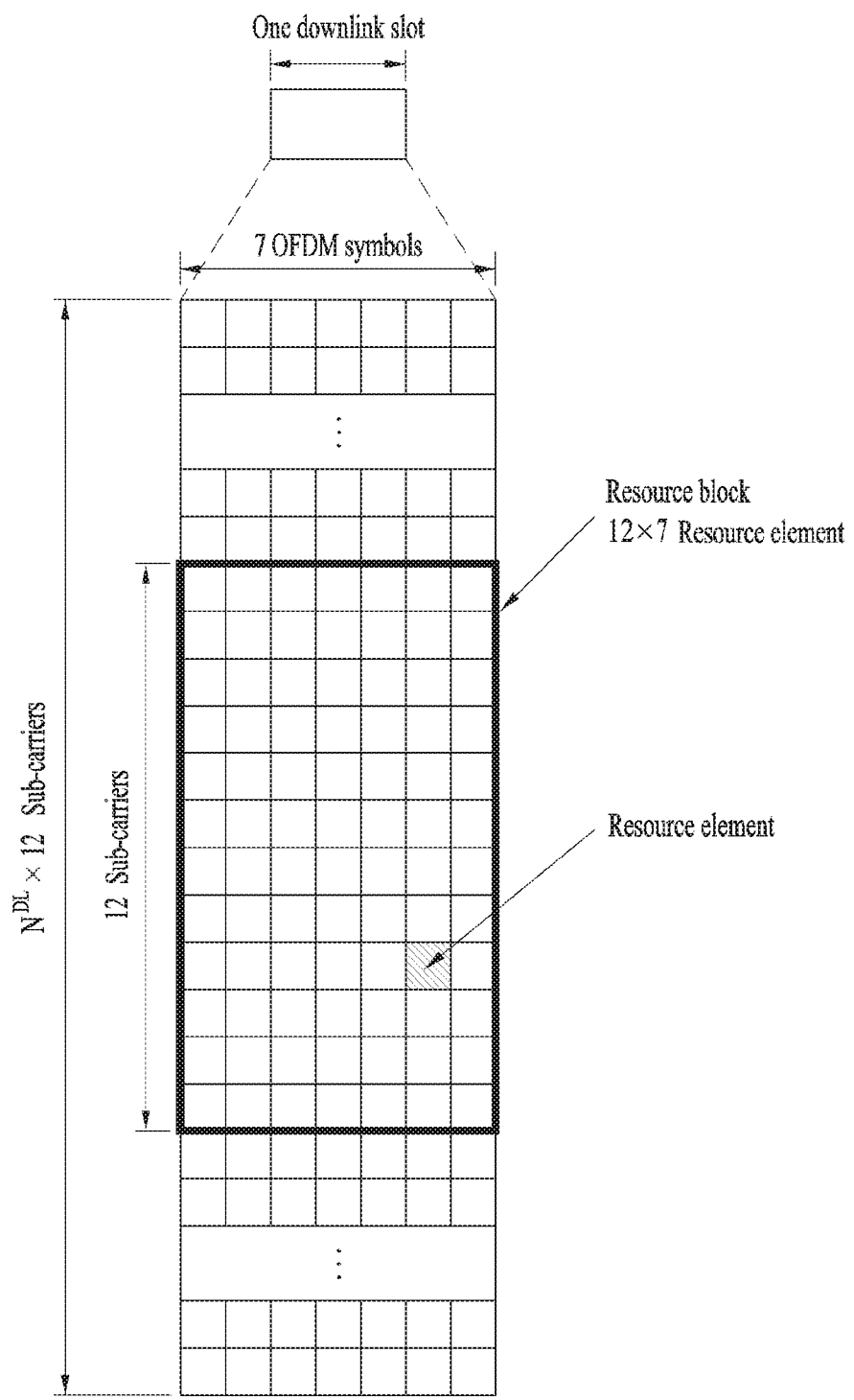
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
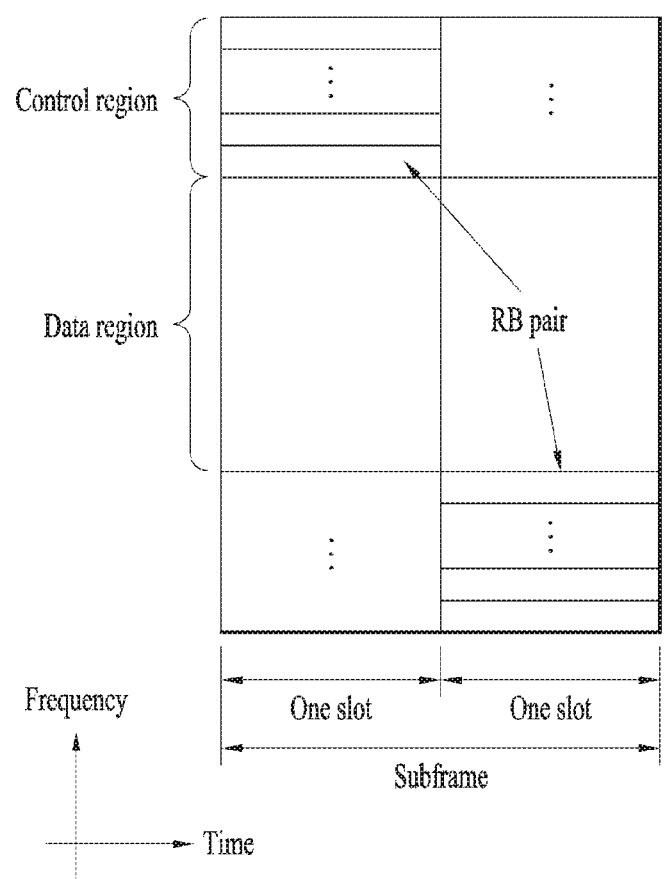
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
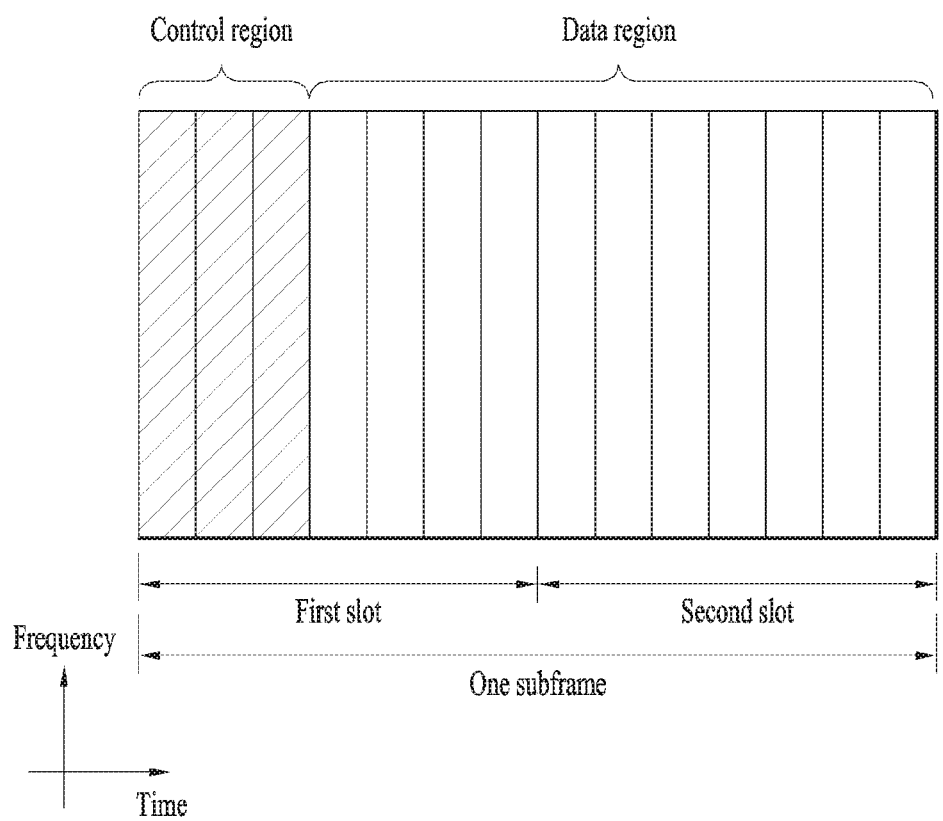
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$, | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying $i \bmod n=0$.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |

TABLE 4-continued

| PDCCH format | Number of CCEs (n) | Number of candidates in common search space | Number of candidates in dedicated search space |
|---|---|---|---|
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
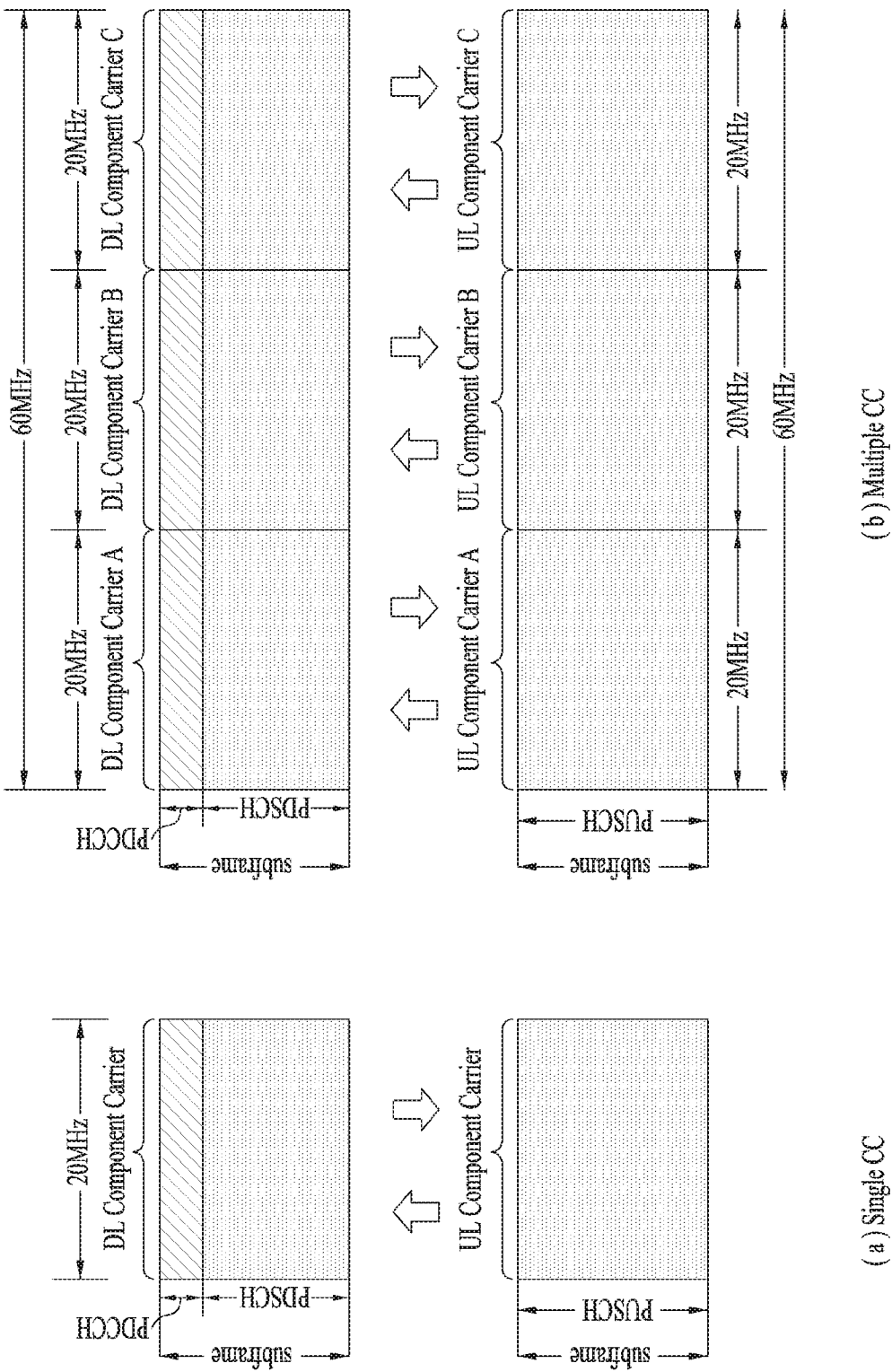
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
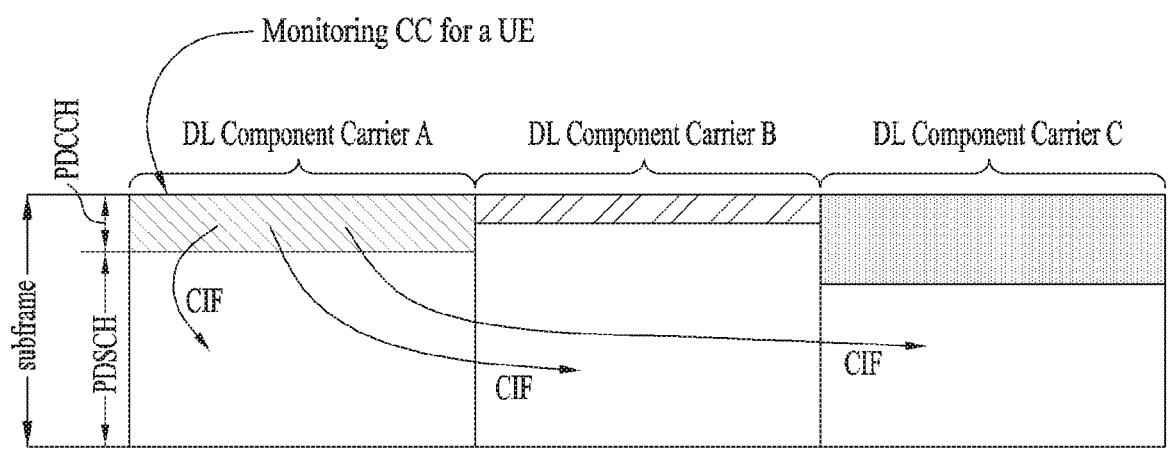
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
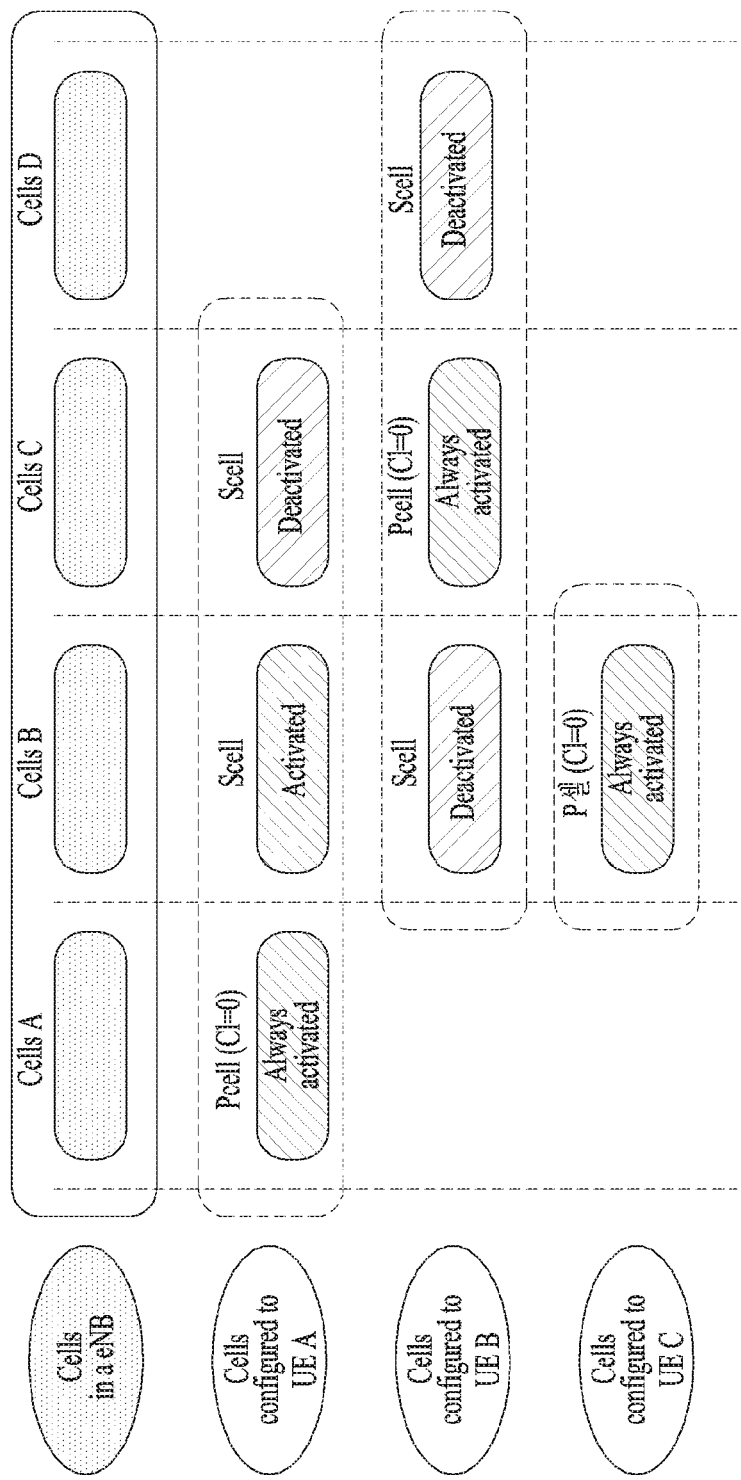
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
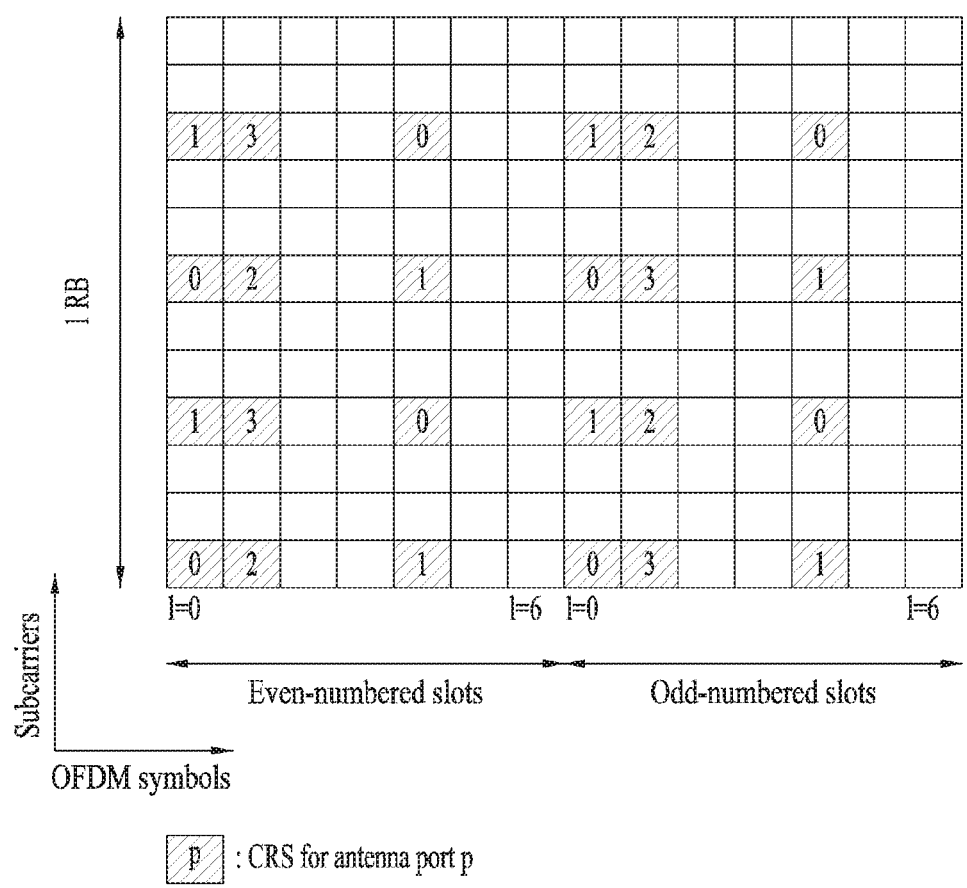
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot ns.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2.4.1 UE-RS

Figure 11:
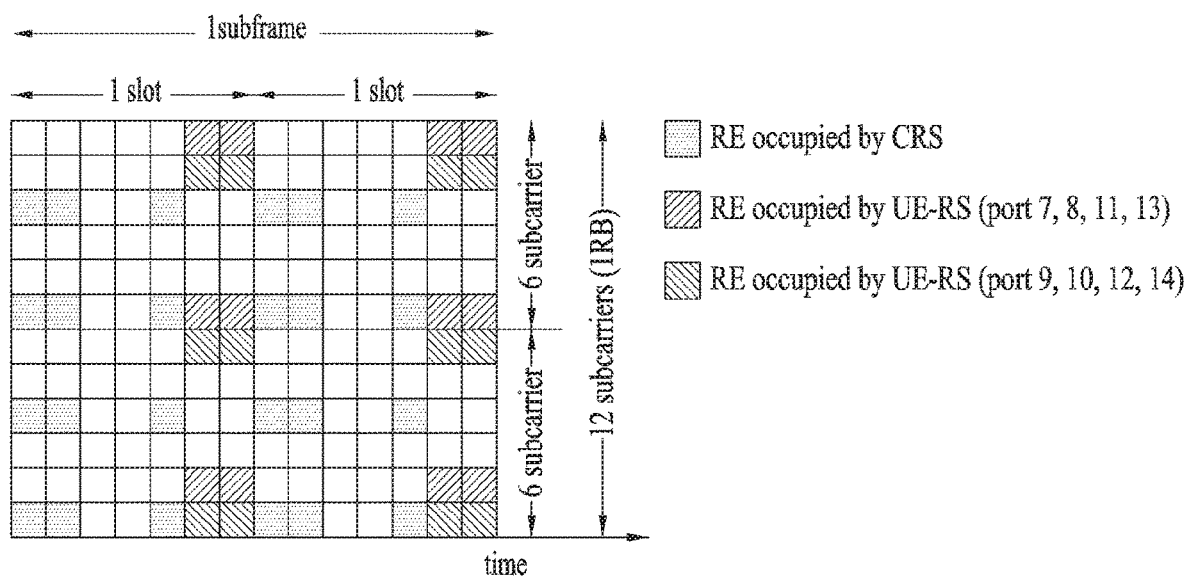
FIG. 11 is a diagram for an example of a subframe to which a UE-RS (user equipment specific reference signal), which is usable in the embodiments of the present invention, is assigned.

FIG. 11 illustrates a UE-RS. In particular, FIG. 11 illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. In particular, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. And, the UE-RSs are transmitted through antenna port(s) respectively corresponding to layer(s) of a PDSCH unlike CRSs configured to be transmitted through all antenna port(s) irrespective of the number of layer(s) of PDSCH. Accordingly, overhead of the RS may decrease relative to overhead of the CRS.

Table 6 in the following shows an orthogonal cover code (OCC) used for generating a UE-RS in case of a normal CP.

TABLE 6

| Antenna port P | $[\bar{w}_p(0) \; \bar{w}_p(1) \; \bar{w}_p(2) \; \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

2.4.2 CSI-RS

Figure 12:
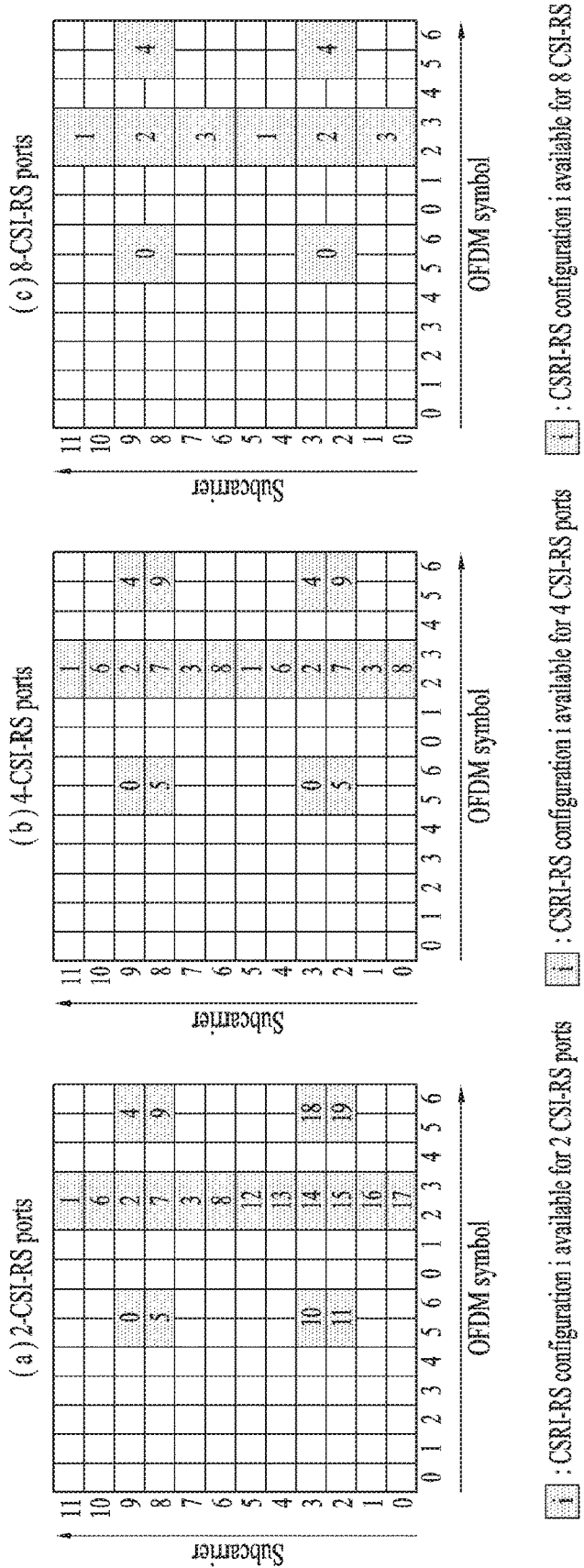
FIG. 12 is a diagram for an example of subframes to which a CSI-RS capable of being used in the embodiments of the present invention is assigned according to the number of antennas.

FIG. 12 is a diagram for an example of subframes to which a CSI-RS capable of being used in the embodiments of the present invention is assigned according to the number of antennas.

A CSI-RS is a DL reference signal introduced to 3GPP LE-A system not to perform demodulation but to measure a state of a radio channel. 3GPP LTE-A system defines a plurality of CSI-RS configurations for CSI-RS transmission. In subframes in which CSI-RS transmission is configured, a CSI-RS sequence is mapped according to complex modulation symbols which are used as reference symbols on an antenna port p.

FIG. 12(a) shows 20 CSI-RS configurations ranging from 0 to 19 capable of being used for transmitting a CSI-RS by 2 CSI-RS ports among CSI-RS configurations, FIG. 12(b) shows 10 CSI-RS configurations ranging from 0 to 9 capable of being used for transmitting a CSI-RS by 4 CSI-RS ports among the CSI-RS configurations, and FIG. 12(c) shows 5 CSI-RS configurations ranging from 0 to 4 capable of being used for transmitting a CSI-RS by 8 CSI-RS ports among the CSI-RS configurations.

In this case, a CSI-RS port may correspond to an antenna port which is configured for CSI-RS transmission. Since a CSI-RS configuration varies according to the number of CSI-RS ports, although CSI-RS configuration numbers are identical to each other, if the number of antenna ports configured for CSI-RS transmission is different, it can be considered as a different CSI-RS configuration.

Meanwhile, a CSI-RS is configured to be transmitted with a certain transmission period corresponding to a plurality of subframes unlike a CRS configured to be transmitted in every subframe. Hence, a CSI-RS configuration varies according to not only positions of REs occupied by a CSI-RS in an RB pair but also a subframe to which the CSI-RS is set.

Although CSI-RS configuration numbers are identical to each other, if a subframe for CSI-RS transmission is different, it can be considered as a different CSI-RS configuration. For example, if a CSI-RS transmission period ($T_{CSI-RS}$) is different or if a start subframe ($\Delta_{CSI-RS}$) to which CSI-RS transmission is set is different in a radio frame, it can be considered as a different CSI-RS configuration.

In the following, in order to distinguish (1) a CSI-RS configuration to which a CSI-RS configuration number is assigned from (2) a CSI-RS configuration which varies according to a CSI-RS configuration number, the number of CSI-RS ports, and/or a subframe in which a CSI-RS is configured, the latter CSI-RS configuration (2) is referred to as a CSI-RS resource configuration. The former CSI-RS configuration (1) is referred to as a CSI-RS configuration or a CSI-RS pattern.

When an eNB informs a UE of the CSI-RS resource configuration, the eNB can inform the UE of information on the number of antennas used for transmitting CSI-RSs, a CSI-RS pattern, a CSI-RS subframe configuration $I_{CSI-RS}$, UE assumption on reference PDSCH transmitted power for CSI feedback $P_c$, a zero power CSI-RS configuration list, a zero power CSI-RS subframe configuration, and the like.

The CSI-RS subframe configuration index $I_{CSI-RS}$ corresponds to information for specifying a subframe configuration period $T_{CSI-RS}$ and a subframe offset $\Delta_{CSI-RS}$ for the occurrence of CSI-RSs. Table 7 in the following illustrates the CSI-RS subframe configuration index $I_{CSI-RS}$ according to the $T_{CSI-RS}$ and the $\Delta_{CSI-RS}$.

TABLE 7

| CSI-RS-SubframeConfig $I_{CSI-RS}$ | CSI-RS periodicity $T_{CSI-RS}$ (Subframes) | CSI-RS subframe offset $\Delta_{CSI-RS}$ (Subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

In this case, subframes satisfying equation 3 in the following become subframes including a CSI-RS.

$$(10n_f + \lfloor n_s/2 \rfloor - \Delta_{CSI-RS}) \bmod T_{CSI-RS} = 0 \quad \text{[Equation 3]}$$

A UE configured by a transmission mode defined in a system appearing after 3GPP LTE-A system (e.g., transmission mode 9 or a newly defined transmission mode) the UE performs channel measurement using a CSI-RS and may be able to decode PDSCH using a UE-RS.

A UE configured by a transmission mode defined in a system appearing after 3GPP LTE-A system (e.g., transmission mode 9 or a newly defined transmission mode) the UE performs channel measurement using a CSI-RS and may be able to decode PDSCH using a UE-RS.

2.5 Enhanced PDCCH (EPDCCH)

In a state that a plurality of component carriers (CCs=(serving) cells) are combined in 3GPP LTE/LTE-A system, a cross carrier scheduling (CCS) operation is defined in the following. A scheduled CC can be configured to receive DL/UL scheduling from a scheduling CC only. In this case, basically, the scheduling CC can perform DL/UL scheduling on the scheduling CC itself. In other word, a search space (SS) for PDCCH, which schedules the scheduled CC/scheduling CC in the CCS relation, may exist at control channel regions of all scheduling CCs.

Meanwhile, it may be able to configure FDD DL carrier or TDD DL subframes to use first n (n≤4) number of OFDM symbols of each subframe to transmit PDCCH, PHICH, and PCFICH corresponding to physical channels for transmitting various control information and it may be able to configure the remaining OFDM symbols to be used for transmitting PDSCH. In this case, information on the number of OFD symbols used for transmitting a control channel in each subframe can be transmitted to a UE using a dynamic scheme through such a physical channel as PCFICH or a semi-static scheme through RRC signaling.

Figure 13:
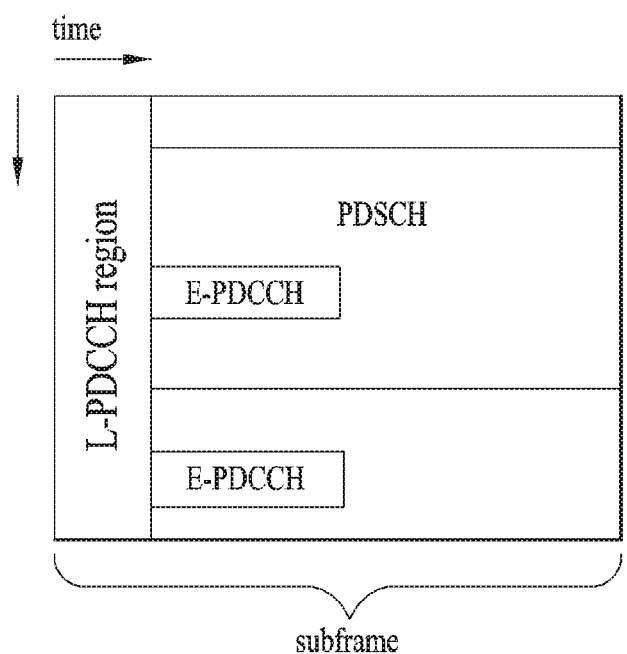
FIG. 13 is a diagram for an example of multiplexing a legacy PDCCH, PDSCH, and E-PDCCH used in LTE/LTE-A system.

Meanwhile, in LTE/LTE-A system, since PDCCCH corresponding to a physical channel for transmitting DL/UL scheduling and various control information has a limitation that the PDCCH is transmitted via restricted OFDM symbols only, it may be able to introduce an enhanced PDCCH (i.e., E-PDCCH), which is more freely multiplexed with PDSCH using FDM/TDM scheme, instead of such a control channel transmitted via OFDM symbol separated from the PDSCH as PDCCH. FIG. 13 is a diagram for an example of multiplexing a legacy PDCCH, PDSCH, and E-PDCCH used in LTE/LTE-A system.

3. Massive MIMO Environment

In FIGS. 14 to 17, massive MIMO environment is explained.

Figure 14:
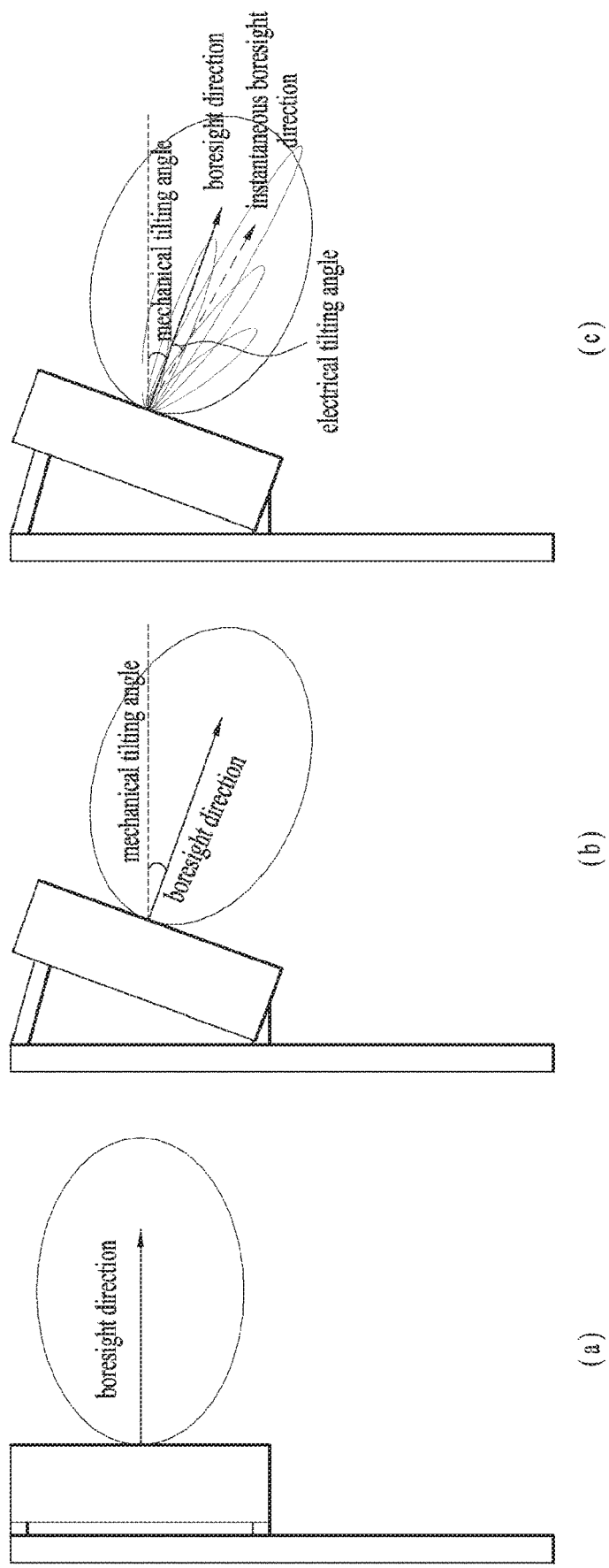
FIG. 14 is a diagram for examples of antenna tilting.

FIG. 14 is a diagram for examples of antenna tilting. According to a legacy cellular system, a base station controls a beam transmission direction of an antenna using a mechanical tilting or an electrical tilting. The base station reduces inter-cell interference and enhances SINR of UEs in a cell through the antenna tilting. Yet, in case of the mechanical tilting, there is a demerit in that a beam direction is fixed when an antenna is initially installed. Moreover, in case of the electrical titling, although a tilting angle is modifiable using a phase shift module, there in a demerit in that it is able to perform very limitative vertical beamforming (vertical beamforming) only. FIG. 14(a) shows a case that the antenna tilting is not performed, FIG. 14(b) shows a case that the mechanical tilting is performed, and FIG. 14(c) shows a case that the electrical tilting (or both the electrical titling and the mechanical tilting) is performed, respectively.

Figure 15:
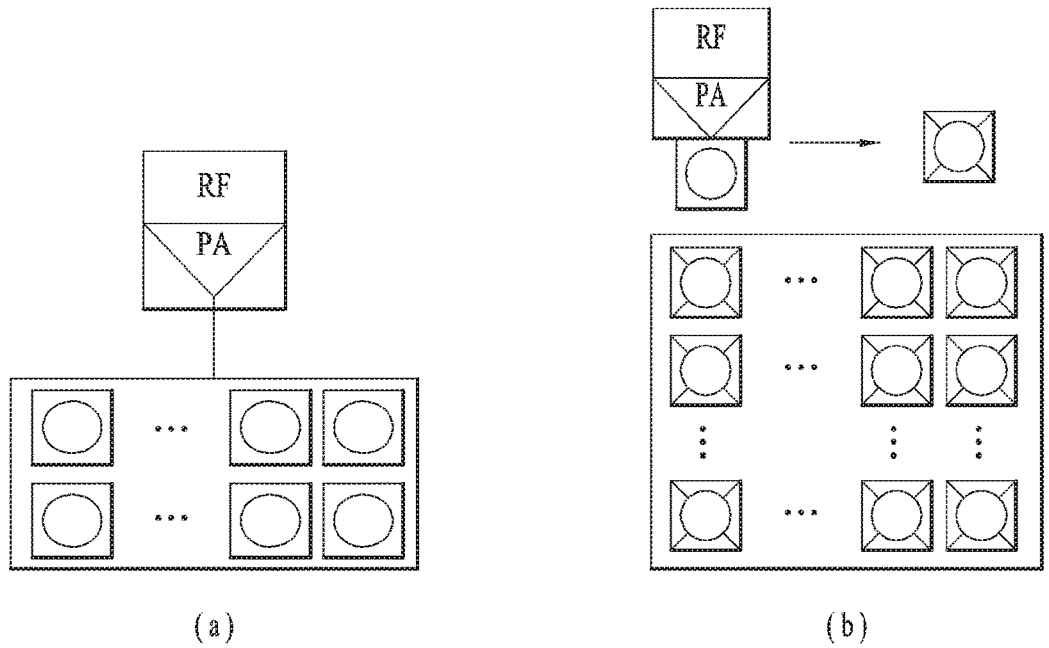
FIG. 15 is a diagram for an example of implementing an AAS (active antenna system).

FIG. 15 is a diagram for an example of implementing an AAS (active antenna system).

Referring to FIG. 15, unlike a legacy passive antenna system (PAS), an active antenna system (AAS) corresponds to a system that each of a plurality of antenna modules includes an RF module including a power amplifier. FIG. 15(b) shows an example of implementing the AAS. Since each antenna module has an active element, each of a plurality of the antenna modules can autonomously control power and a phase.

A legacy MIMO antenna structure considers a linear structure (i.e., one dimensional array antenna) such as a ULA (uniform linear array). In one dimensional array structure, beams capable of being generated by beamforming of antennas exist in a two-dimensional plane. This can also be applied to a legacy PAS-based MIMO structure. Although vertical antenna array and horizontal antenna array exist in the PAS-based MIMO structure, since antennas are controlled by a single RF module, it is difficult to perform beamforming in vertical direction or simple mechanical tilting is available only.

On the contrary, according to the AAS-based antenna structure, since an RF module is independently installed in every antenna, beamforming is enabled not only in horizontal direction but also in vertical direction. This is called elevation beamforming. As the elevation beamforming is enabled, 3D beamforming that beamforming results of antennas are represented in a 3 dimensional space is enabled. In particular, the 3 dimensional beamforming is enabled in a manner that one dimensional array antenna structure is evolved to a two dimensional array antenna structure of a plane form. In this case, as shown in FIG. 15(b), the 3 dimensional beamforming can be performed not only in a planar form but also in a conformal ring form in the AAS. In particular, the 3 dimensional beamforming has a characteristic in that a MIMO process is performed in a 3 dimensional space as an antenna array is evolved to 2D or 3D instead of a legacy straight line.

Figure 16:
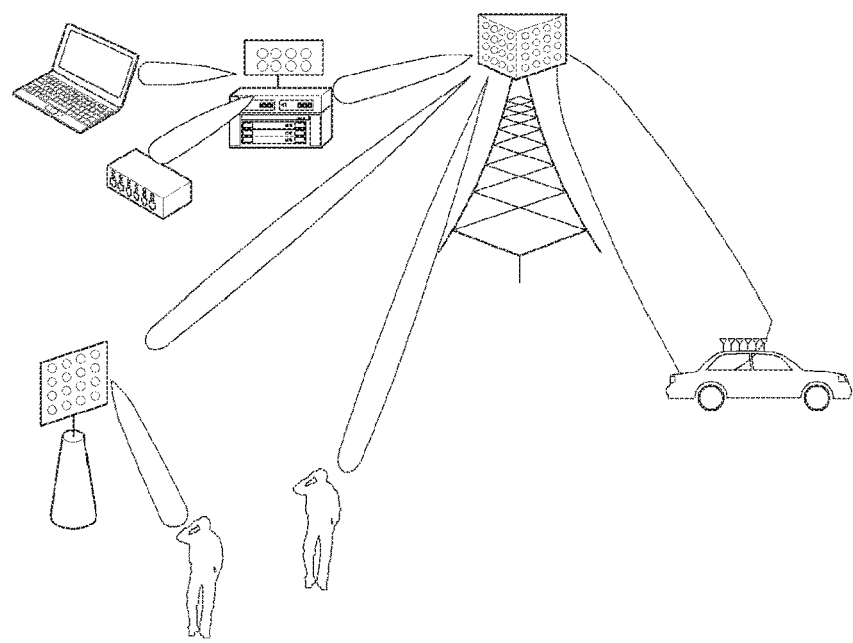
FIG. 16 is a diagram for an example of transmitting a UE-specific beam based on AAS.

FIG. 16 is a diagram for an example of transmitting a UE-specific beam based on AAS. Referring to FIG. 16, with the help of 3 dimensional beamforming, although a user equipment moves back and forth of a base station and left and right of the base station, the base station is able to perform beamforming. Hence, the base station is able to perform UE-specific beamforming and transmission.

Figure 17:
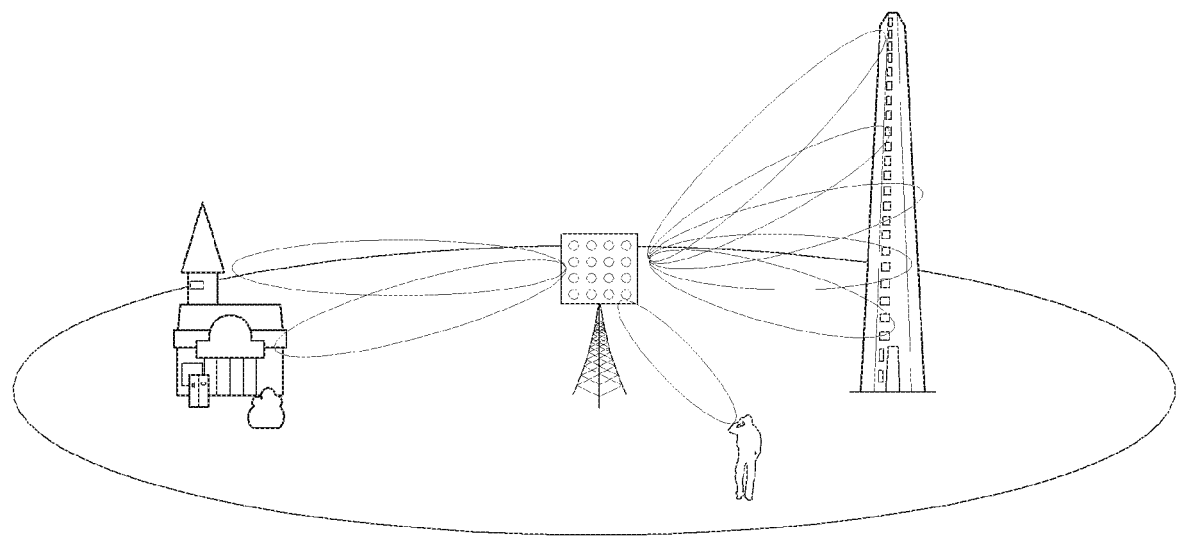
FIG. 17 is a diagram for an example of transmitting a 2D beam based on AAS.

FIG. 17 is a diagram for an example of transmitting a 2D beam based on AAS.

The aforementioned AAS-based 2 dimensional antenna array can be applied not only to a case that an outdoor base station transmits a beam to an outdoor UE but also to environment (O2I, outdoor to indoor) that an outdoor base station transmits a beam to an indoor UE and environment (indoor hotspot) that an indoor base station transmits a beam to an indoor UE.

In case of considering actual cell environment in which many buildings exist, the aforementioned contents, as shown in FIG. 17, reflects a fact that it is necessary for a base station to consider not only a beam steering in horizontal direction but also a beam steering in vertical direction in consideration of various terminal heights according to the heights of the buildings. When the cell environment is considered, unlike legacy radio channel environment, it is necessary to additionally consider a change of shade/path loss, a fading characteristic change (LoS/NloS (Line-of-sight/Non-Line-of-sight), DoA (direction of arrival), etc.). To this end, research and development for a 3D channel model as a 3GPP LTE Rel-12 standardization item is consistently performed.

4. Method of Configuring Proposed RS

Figure 18:
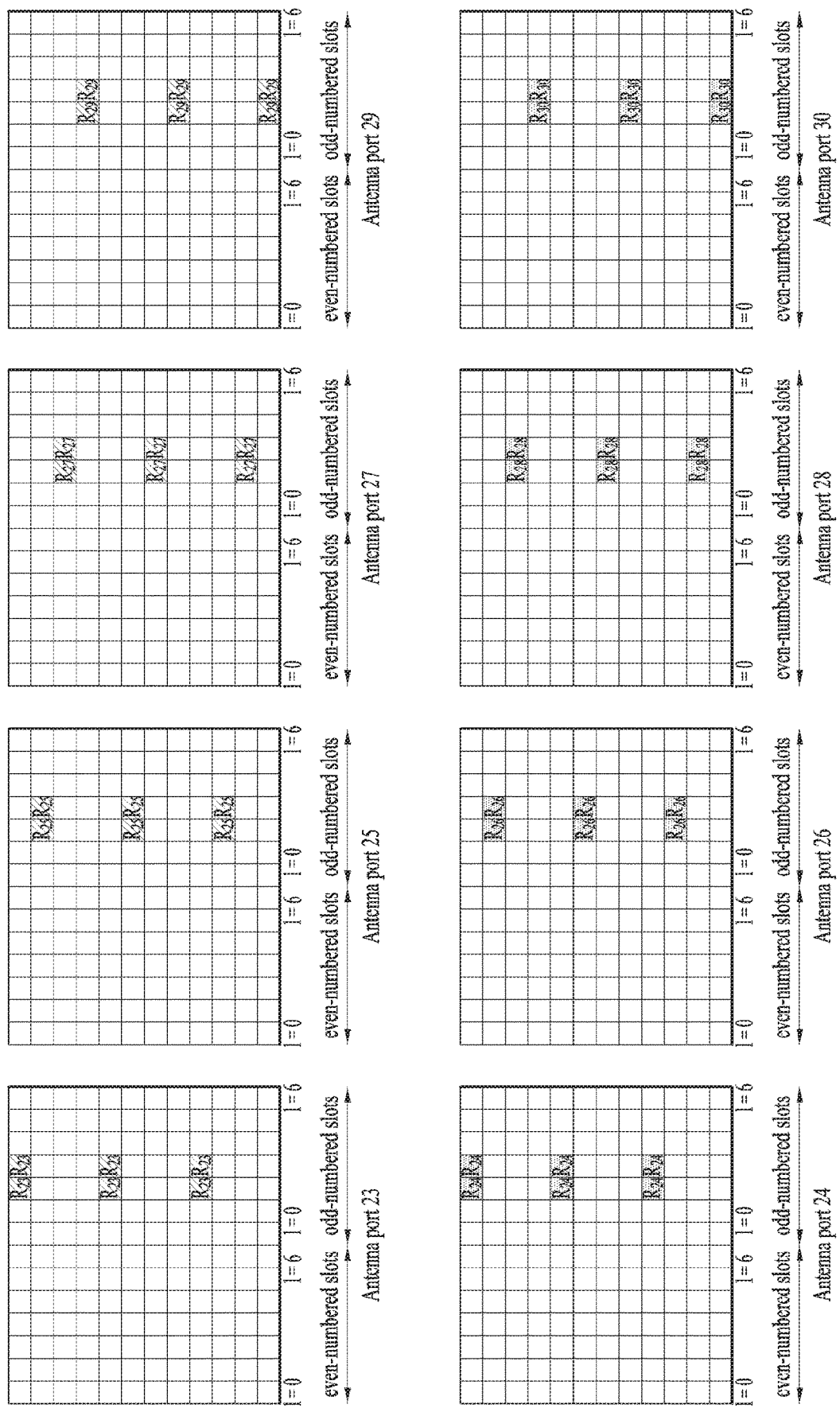
FIGS. 18 and 19 are diagrams for an example of configuring an RS according to embodiments proposed by the present invention.
Figure 19:
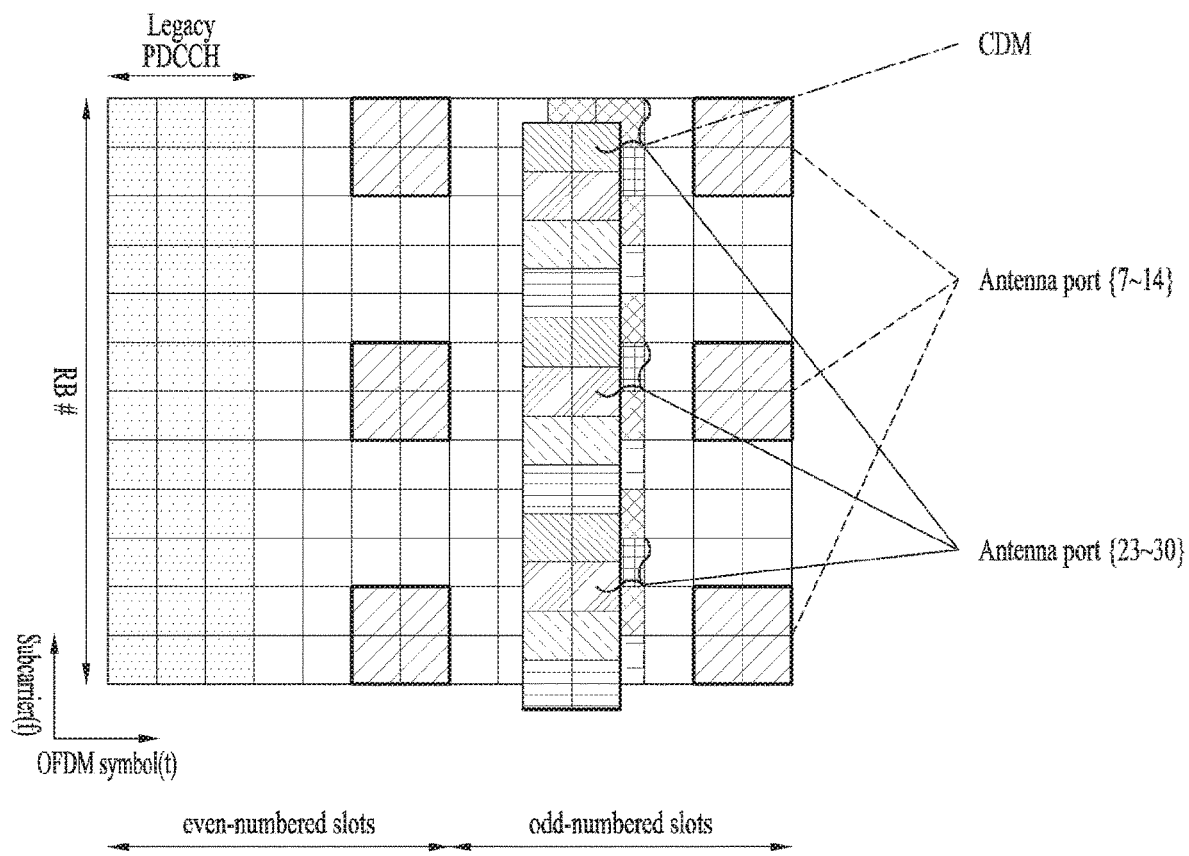

FIGS. 18 and 19 are diagrams for an example of configuring an RS according to embodiments proposed by the present invention.

In the following, the present invention proposes a method of configuring a new RS capable of being applied to a case that transmission of multiple streams of which the number of layers is equal to or greater than 9 is performed. The proposed method can be applied to a UE-RS and the method is performed in a manner of multiplexing RS using a legacy UE-RS allocation pattern and a CDM (code division multiplexing) scheme. According to the proposed method, a UE-RS is additionally allocated from a $9^{th}$ layer to identically maintain RS density per antenna port with legacy RS density in a frequency axis.

First of all, according to one embodiment, an antenna port can be additionally defined for a case that the number of layers is equal to or greater than 9. An index of a layer and an index of an antenna port can be implemented as shown in Table 8 in the following.

TABLE 8

| Layer index | Antenna port index |
|---|---|
| 9 | 23 |
| 10 | 24 |
| 11 | 25 |
| 12 | 26 |

TABLE 8-continued

| Layer index | Antenna port index |
| --- | --- |
| 13 | 27 |
| 14 | 28 |
| 15 | 29 |
| 16 | 30 |

In Table 8, a layer index is matched with the maximum rank number used by a UE. For example, if a rank used by the UE corresponds to 11, $9^{th}$, $10^{th}$, and $11^{th}$ layers correspond to $23^{rd}$, 24th, and $25^{th}$ antenna ports, respectively. In this case, $1^{st}$ to $8^{th}$ layers reuse a legacy antenna port.

FIG. 18 illustrates an example of mapping an RS to antenna ports 23 to 30 according to the embodiment mentioned earlier in Table 8. Referring to FIG. 18, RSs are mapped to an identical position (i.e., the same RE) in response to antenna ports 23 and 24. By doing so, rank 9/10 transmission has the same RS overhead. And, RSs are mapped to an identical RE in response to antenna ports 25 and 26 and RSs are mapped to an identical RE in response to antenna ports 27 and 28 and antenna ports 29 and 30, respectively.

Meanwhile, RSs for antenna ports 23, 25, 27 and 29 are mapped to a different frequency axis. In particular, the RSs are distinguished from each other using a FDM (frequency division multiplexing) scheme for the antenna ports 23, 25, 27, and 29 (or antenna ports 24, 26, 28, and 30).

In the following, a method of distinguishing RSs mapped to an identical position is explained via FIG. 19. As mentioned in the foregoing description, the RSs for the antenna ports 23, 25, 27, and 29 (or antenna ports 24, 26, 28, and 30) are distinguished from each other using the FDM scheme. Yet, as shown in FIG. 18, RSs corresponding to antenna ports 23 and 24 (or antenna ports 25 and 26, antenna ports 27 and 28, antenna ports 29 and 30) are mapped to an identical position in a resource region (e.g., subframe). Hence, it is necessary to have a method of distinguishing the RSs.

The embodiment shown in FIG. 19 shows UE-RSs assigned to a single RB when a UE uses 16 layers. In FIG. 19, REs represented by a diagonal line correspond to REs to which a UE-RS for legacy antenna ports 7 to 14 is assigned.

Meanwhile, in FIG. 19, two overlapped regions (configured by 2*12=24 number of REs) correspond to the proposed REs allocated for the antenna ports 23 to 30. The two overlapped regions indicate that a UE-RS, which is generated by a different code, is assigned to a corresponding position. In other word, UE-RSs of the antenna ports 23 and 24 to which an identical positon is allocated can be distinguished from each other using the CDM scheme in an RB or a subframe. Similarly, UE-REs of the antenna ports 25 and 26, UE-REs of the antenna ports 27 and 28, and UE-REs of the antenna ports 29 and 30 can be distinguished using the CDM scheme.

If a UE uses 16 layers, overhead of UE-RS increases as much as twice compared to the legacy 8 layers. On the contrary, in order to satisfy a condition that RS density per antenna port is identically maintained with legacy RS density, it may indicate that multiplexing of the CDM scheme is applied in the course of distinguishing two antenna ports sharing the same RE with each other.

As shown in FIG. 19, a positon of a UE-RS used in the antenna ports 23 to 30 may correspond to $3^{rd}$ and $4^{th}$ OFDM symbols in a second slot of a subframe. Specifically, the UE-RS can be mapped in a manner that two OFDM symbols contiguous in a time axis are repeated in every 4 subcarriers in response to each antenna port. A first reason for selecting the position is that the position is not overlapped with a legacy CRS and a DMRS. Although the positon is overlapped with a legacy CSI-RS, the problem can be solved by dropping the CSI-RS.

Meanwhile, a receiver (UE) estimates 2 antenna ports (mapped to an identical RE) multiplexed by the CDM scheme from 2 REs corresponding to a UE-RS. As channel correlation of the 2 REs is higher, estimation performance is enhanced. Specifically, a procedure of estimating an antenna port corresponds to a procedure of estimating an effective channel corresponding to the antenna port.

As mentioned in the foregoing description, since a UE-RS is assigned to an RE corresponding to 2 adjacent OFDM symbols in time axis, if a moving speed of a UE is slow, channels of two REs are very similar. Hence, when an antenna port of a UE is estimated, it may be able to minimize performance deterioration which occurs when channels of two REs are different from each other.

Meanwhile, a result for an estimated antenna port is interpolated and the interpolated result can be used for an antenna port estimation procedure in a different RE. For example, a receiver estimates and obtains 3 antenna port values from 6 REs in response to the antenna port 23 in FIG. 18 and obtains one antenna port value in the entire RB based on the 3 estimated result values. If a moving speed of a UE is fast, an antenna port value may have a significant error depending on an interpolation process and an estimation result. Yet, if the moving speed of the UE is slow, it may be able to estimate an antenna port with sufficiently high accuracy using 2 UE-RS only.

In the following, an embodiment for a procedure of generating a UE-RS is explained in detail. Specifically, a procedure of generating an RS sequence loaded on an RE to which UE-RS of antenna ports 23 to 30 is mapped is explained. First of all, a sequence (RS sequence) $r(m)$ of a UE-RS is defined according to equation 4 described in the following.

$$r(m) = \frac{1}{\sqrt{2}}(1 - 2c(2m)) + j\frac{1}{\sqrt{2}}(1 - 2c(2m+1)), \quad \text{[Equation 4]}$$

$$m = 0, 1, \ldots, 12N_{RB}^{max,DL} - 1$$

In equation 4, $c(i)$ corresponds to an $i^{th}$ element of a pseudo-random sequence and it is defined by ETSI TS 136,211-7.2. Meanwhile, the RS sequence generated by equation 4 is transmitted to a base station as a data symbol defined by equation 5 described in the following.

$$a_{k,l}^{(p)} = w_p(l') \cdot r(3 \cdot l' \cdot N_{RB}^{max,DL} + 3 \cdot n_{PRB} + m') \quad \text{[Equation 5]}$$

where $m' = 0, 1, 2$ $$w_p(i) = \begin{cases} \overline{w}_p(i) & (m' + n_{PRB}) \bmod 2 = 0 \\ \overline{w}_p(1-i) & (m' + n_{PRB}) \bmod 2 = 1 \end{cases}$$

$k = 4m' + N_{sc}^{RB} \cdot n_{PRB} + k'$

-continued $$k' = \begin{cases} 0 & \text{if } p = 23, 24 \\ 1 & \text{if } p = 25, 26 \\ 2 & \text{if } p = 27, 28 \\ 3 & \text{if } p = 29, 30 \end{cases}$$

$$l = 2, 3 \text{ if } n_s \bmod 2 = 1$$

In equation 5, k corresponds to a position of a frequency axis, l corresponds to a position of a time axis, p corresponds to an antenna port, $n_{PRB}$ corresponds to an RB index assigned to a UE, and $n_s$ corresponds to a slot index, respectively. And, in equation 5, $m'=0,1,2$ indicates that 3 REs are defined in frequency axis for one antenna port. And, in $k=4m'+N_{sc}^{RB} \cdot n_{PRB}+k'$, '4' indicates that the 3 REs are distributed with a space of 4 subcarriers in frequency axis and k' indicates that a position of an RE corresponding to an antenna port moves according to the antenna port in frequency band.

In equation 5, $\overline{w}_p(i)$ corresponds to a code (CDM scheme) for distinguishing two antenna ports mapped to an identical RE position from each other and the code is defined according to Table 9 described in the following.

TABLE 9

| Antenna port p | $[\overline{w}_p(0) \ \overline{w}_p(1)]$ |
|---|---|
| 23 | [+1 +1] |
| 24 | [+1 −1] |
| 25 | [−1 −1] |
| 26 | [−1 +1] |
| 27 | [+1 +1] |
| 28 | [+1 −1] |
| 29 | [−1 −1] |
| 30 | [−1 +1] |

Meanwhile, the contents defined in Table 9 are just an example only. The contents can also be defined as Table 10 in the following.

TABLE 10

| Antenna port p | $[\overline{w}_p(0) \ \overline{w}_p(1)]$ |
|---|---|
| 23 | [+1 +1] |
| 24 | [+1 −1] |
| 25 | [+1 +1] |
| 26 | [+1 −1] |
| 27 | [−1 −1] |
| 28 | [−1 +1] |
| 29 | [−1 −1] |
| 30 | [−1 +1] |

According to one embodiment, if there is an antenna port not in use among antenna ports 23 to 30, it is able to map PDSCH to an RE allocated to the antenna port.

For example, if a rank of a UE corresponds to 10, antenna ports 7 to 13 and antenna ports 23 and 24 are used. In this case, since antenna ports 25 to 30 are not used, a base station does not assign a UE-RS of the antenna ports. Instead, the base station maps PDSCH to an RE positon corresponding to the UE-RS of the antenna ports 25 to 30 to transmit the PDSCH to the UE.

Meanwhile, although the UE-RS is newly defined for the antenna ports 23 to 30 in the foregoing description, the indexes of the antenna ports are just an example only. In particular, the method of configuring a UE-Rs proposed in the present invention can also be applied to different antenna port indexes rather than the antenna ports 23 to 30.

Figure 20:
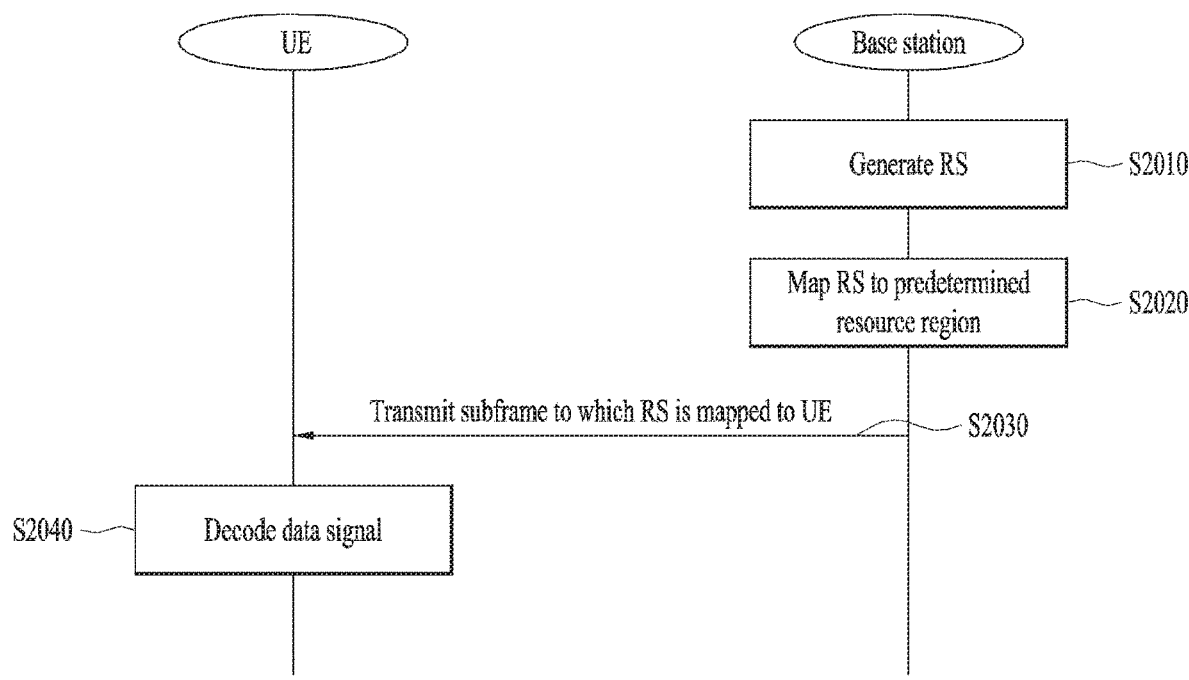
FIG. 20 is a flowchart for a method of configuring an RS proposed by the present invention.

FIG. 20 is a flowchart for a method of configuring an RS proposed by the present invention. In FIG. 20, an RE configuration method according to the aforementioned embodiments is explained in accordance with a time flow. Hence, although content is not explicitly shown or explained in FIG. 20, it is able to easily aware that the contents mentioned earlier in FIGS. 18 and 19 are identically or similarly applied to FIG. 20.

First of all, a base station generates a UE-RS [S2010]. As mentioned earlier in equations 4 and 5, this procedure can be performed through a procedure of generating an RS sequence from an initial value. Subsequently, the base station maps the generated UE-RS to a predetermined resource region [S2020]. The resource region to which the UE-RS is mapped is determined in advance according to an index of an antenna port. A mapping relation is determined according to the definition defined by equation 5.

Meanwhile, the UE-RS can be mapped to $3^{rd}$ and $4^{th}$ OFDM symbols included in a second slot of a subframe. UE-RSs can be mapped to one antenna port with a space of 4 subcarriers. UE-RSs mapped to 2 adjacent OFDM symbols are repeated three times with an interval of 4 subframes. As a result, 12 UE-RSs in total are mapped to a subframe. Meanwhile, two antenna ports are assigned to an identical RE in a subframe. UE-RSs corresponding to the two antenna ports are mapped in a manner of being multiplexed using a CDM scheme.

Subsequently, the base station transmits a subframe to which an RS is mapped to the UE [S2030] and the UE decodes a received data signal [S2040]. In the course of decoding the data signal, the UE may refer to the UE-RS generated/mapped by the base station.

5. Apparatus Configuration

Figure 21:
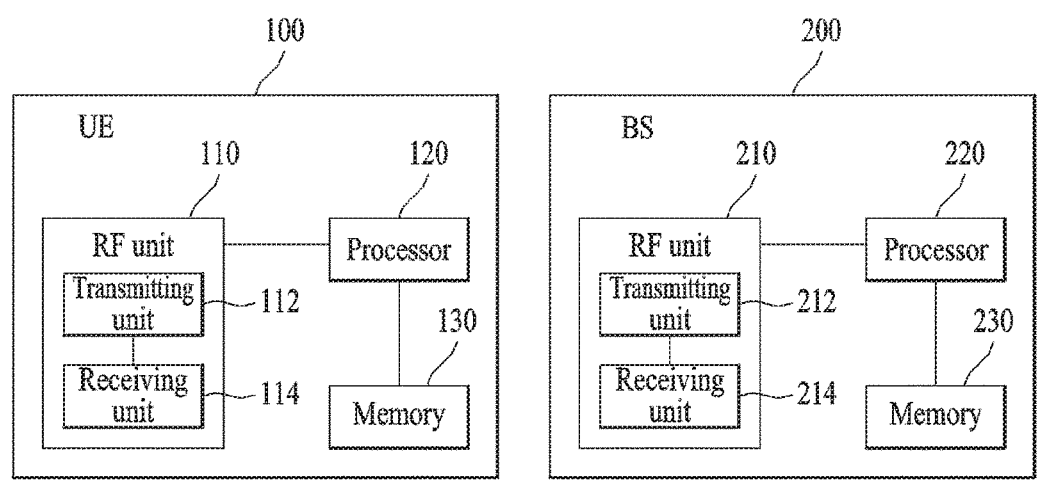
FIG. 21 is a diagram for configurations of a user equipment and a base station according to one embodiment of the present invention.

FIG. 21 is a block diagram showing the configuration of a user equipment and a bas eseetation according to one embodiment of the present invention. In FIG. 21, a user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 21, a communication environment may be established between a plurality of reception module and the transmission module. In addition, the base station 200 shown in FIG. 21 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and repcetion modules and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method of generating a sequence is described centering on examples applied to 3GPP LTE and LTE-A, it may be applicable to various wireless communication systems including IEEE 802.16x as well as to the LTE/LTE-A system.

What is claimed is:

1. A method of transmitting downlink signals based on a user equipment (UE) specific reference signal (RS) by a base station (BS) including a plurality of antennas in a wireless communication system, the method comprising:
  generating RS sequences for a plurality of antenna ports used for data transmission;
  mapping the generated RS sequences to resources allocated for the plurality of antenna ports; and
  transmitting, to the UE, downlink signals via a subframe to which the generated RS sequences are mapped,
  wherein the plurality of antenna ports comprise more than 8 antenna ports,
  wherein a first resource region used for RS sequences for first 8 antenna ports of the plurality of antenna ports is different from a second resource region used for RS sequences for remaining antenna ports of the plurality of antenna ports,
  wherein the second resource region is divided into 4 resource groups in third and fourth orthogonal frequency division multiplexing (OFDM) symbols of a second slot of the subframe,
  wherein each of the 4 resource groups is allocated for 2 antenna ports of the remaining antenna ports based on a number of the remaining antenna ports, a maximum number of the remaining antenna ports is 8,
  wherein each of the 4 resource groups includes 6 resource elements assigned based on an interval of 4 subcarriers in each of the third and fourth OFDM symbols,
  wherein RS sequences for 2 antenna ports of the remaining antenna ports allocated to an identical resource group are multiplexed based on a code division multiplexing (CDM) scheme,
  wherein the first 8 antenna ports are multiplexed based on a length-4 orthogonal cover code (OCC) in the first resource region and the remaining antenna ports are multiplexed based on a length-2 OCC in the second resource region,
  wherein the remaining antenna ports are indexed from an antenna port index 23 to an antenna port index 30,
  wherein RS sequences for two antenna ports of antenna port indexes 23 and 24 are multiplexed in a first resource group of the 4 resource groups,
  wherein RS sequences for two antenna ports of antenna port indexes 25 and 26 are multiplexed in a second resource group of the 4 resource groups,
  wherein RS sequences for two antenna ports of antenna port indexes 27 and 28 are multiplexed in a third resource group of the 4 resource groups, and
  wherein RS sequences for two antenna ports of antenna port indexes 29 and 30 are multiplexed in a fourth resource group of the 4 resource groups.

2. The method of claim 1, further comprising transmitting a physical downlink shared channel (PDSCH) based on resources allocated for unused antenna ports among the remaining antenna ports.

3. The method of claim 1, wherein a channel state information-reference signal (CSI-RS) is dropped when resources for the remaining antenna ports are overlapped with resources for the CSI-RS.

4. A base station (BS) including a plurality of antennas and transmitting downlink signals based on a user equipment (UE) specific reference signal (RS) in a wireless communication system, the BS comprising:
  a transmitter to transmit signals;
  a receiver to receive signals; and
  at least one processor connected with the transmitter and the receiver and configured to:
    generate RS sequences for a plurality of antenna ports used for data transmission;
    map the generated RS sequences to resources allocated for the plurality of antenna ports; and control the transmitter to transmit, to the UE, downlink signals via a subframe to which the generated RS sequences are mapped,
wherein the plurality of antenna ports comprise more than 8 antenna ports,
wherein a first resource region used for RS sequences for first 8 antenna ports of the plurality of antenna ports is different from a second resource region used for RS sequences for remaining antenna ports of the plurality of antenna ports,
wherein the second resource region is divided into 4 resource groups in third and fourth orthogonal frequency division multiplexing (OFDM) symbols of a second slot of the subframe,
wherein each of the 4 resource groups is allocated for 2 antenna ports of the remaining antenna ports based on a number of the remaining antenna ports, a maximum number of the remaining antenna ports is 8,
wherein each of the 4 resource groups includes 6 resource elements assigned based on an interval of 4 subcarriers in each of the third and fourth OFDM symbols,
wherein RS sequences for 2 antenna ports of the remaining antenna ports allocated to an identical resource group are multiplexed based on a code division multiplexing (CDM) scheme,
wherein the first 8 antenna ports are multiplexed based on a length-4 orthogonal cover code (OCC) in the first resource region and the remaining antenna ports are multiplexed based on a length-2 OCC in the second resource region,
wherein the remaining antenna ports are indexed from an antenna port index 23 to an antenna port index 30,
wherein RS sequences for two antenna ports of antenna port indexes 23 and 24 are multiplexed in a first resource group of the 4 resource groups,
wherein RS sequences for two antenna ports of antenna port indexes 25 and 26 are multiplexed in a second resource group of the 4 resource groups,
wherein RS sequences for two antenna ports of antenna port indexes 27 and 28 are multiplexed in a third resource group of the 4 resource groups, and
wherein RS sequences for two antenna ports of antenna port indexes 29 and 30 are multiplexed in a fourth resource group of the 4 resource groups.

5. The BS of claim 4, wherein a physical downlink shared channel (PDSCH) is transmitted based on resources allocated for unused antenna ports among the remaining antenna ports.

6. The BS of claim 4, wherein a channel state information-reference signal (CSI-RS) is dropped when resources for the remaining antenna ports are overlapped with resources for the CSI-RS.

* * * * *